US008124214B2

(12) United States Patent  (10) Patent No.: US 8,124,214 B2
Hori et al.  (45) Date of Patent: Feb. 28, 2012

(54) FAULT TOLERANT TRANSPORT MECHANISM IN STORAGE AND METHOD OF CONTROLLING THE SAME

(75) Inventors: Daisuke Hori, Kawasaki (JP); Koujiro Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1251 days.

(21) Appl. No.: 11/093,042

(22) Filed: Mar. 30, 2005

(65) Prior Publication Data

US 2006/0099382 A1  May 11, 2006

(30) Foreign Application Priority Data

Nov. 9, 2004 (JP) .................................. 2004-324541
Jan. 24, 2005 (JP) .................................. 2005-015937

(51) Int. Cl.
 *B32B 3/10* (2006.01)
(52) U.S. Cl. ........... 428/138; 369/30.27; 455/76; 700/2; 700/213
(58) Field of Classification Search .................... 455/76; 428/138; 700/2, 213; 369/30.27
 See application file for complete search history.

(56) References Cited

U.S. PATENT DOCUMENTS 5,513,156 A * 4/1996 Hanaoka et al. ............. 711/115
5,982,719 A  11/1999 Nishijima et al.
6,327,519 B1 * 12/2001 Ostwald et al. .............. 700/245

FOREIGN PATENT DOCUMENTS

| JP | 2-130751 | | 5/1990 |
|---|---|---|---|
| JP | 4023118 | * | 1/1992 |
| JP | 6-305514 | | 11/1994 |
| JP | 8-249793 | | 9/1996 |
| JP | 9-293301 | | 11/1997 |
| JP | 10-134460 | | 5/1998 |
| JP | 10134460 A | * | 5/1998 |
| JP | 2004-277167 | | 10/2004 |

OTHER PUBLICATIONS

Japanese Patent Office Action, mailed May 28, 2008 and issued in corresponding Japanese Patent Application No. 2005-015937.

* cited by examiner

*Primary Examiner* — Kakali Chaki
*Assistant Examiner* — Tejal Gami
(74) *Attorney, Agent, or Firm* — Staas & Halsey LLP

(57) ABSTRACT

A method of controlling a transport mechanism allows a first mobile carrier to move based on a power source incorporated in the first mobile carrier when an instructions signal specifying an access to a cell defined in a storage is supplied to a controller. When a fault is detected in the first mobile carrier, the first mobile carrier is moved based on the action of a second mobile carrier. The method ensures the movement of the first mobile carrier with the assistance of the second mobile carrier even when the first mobile carrier suffers from a fault. The first mobile carrier can be moved out of the movable range of the second mobile carrier. The second mobile carrier is allowed to move in the own movable range without an interference to the first mobile carrier. The second mobile carrier keeps operating without an interruption.

4 Claims, 9 Drawing Sheets

FAULT TOLERANT TRANSPORT MECHANISM IN STORAGE AND METHOD OF CONTROLLING THE SAME

BACKGROUND OF THE INVENTION

1. Field of the Invention

The present invention relates to a transport mechanism preferably employed in a library apparatus such as a magnetic tape library apparatus, for example. In particular, the invention relates to a transport mechanism including first and second mobile carriers accessible to individual cells defined in a storage.

2. Description of the Prior Art

As disclosed in Japanese Patent Application Publication 9-293301, for example, a library apparatus sometimes includes first and second mobile carriers accessible to individual cells defined in a storage. The movable range of the first mobile carrier wraps over the movable range of the second mobile carrier.

When a fault occurs in the first mobile carrier, for example, the first mobile carrier may stall in the movable range of the second mobile carrier. The movement of the second mobile carrier is hindered until the first mobile carrier is fixed. The library apparatus is forced to stop operating.

SUMMARY OF THE INVENTION

It is accordingly an object of the present invention to provide a transport mechanism capable of reliably keeping operating all the time without an interruption.

According to a first aspect of the present invention, there is provided a method of controlling a transport mechanism, comprising: driving a first mobile carrier based on a power source incorporated in the first mobile carrier when receiving instructions signal specifying an access to a cell defined in a storage; and driving the first mobile carrier based on action of a second mobile carrier when a fault is detected in the first mobile carrier.

The method ensures the movement of the first mobile carrier with the assistance of the second mobile carrier even when the first mobile carrier suffers from a fault. For example, the first mobile carrier can be moved out of the movable range of the second mobile carrier. The second mobile carrier is allowed to move in the own movable range without an interference to the first mobile carrier. The second mobile carrier keeps operating without an interruption. The transport mechanism thus keeps operating without an interruption.

The second mobile carrier may carry the first mobile carrier to a position outside the movable range of the second mobile carrier when the fault has been detected. The first mobile carrier can be withdrawn from the movable range of the second mobile carrier. The movable range of the second mobile carrier can surely be established. The second mobile carrier keeps operating without an interruption.

According to a second aspect of the present invention, there is provided a transport mechanism comprising: a first mobile carrier accessible to individual cells defined in a storage based on movement within a first movable range; a second mobile carrier accessible to the individual cells based on movement within a second movable range at least partially wrapping over the first movable range; and a guide member designed to guide movement of the first mobile carrier to a position outside the first movable range when the first mobile carrier is brought to an off position outside the second movable range.

When the first mobile carrier stands at the off position, the first mobile carrier stays outside the movable range of the second mobile carrier. The transport mechanism allows the second mobile carrier to keep operating without interference to the first mobile carrier. When the guide member leads the first mobile carrier to the position outside the first movable range from the off position, the first mobile carrier can be subjected to a repair or replacement operation outside the movable range of the second mobile carrier. The movable range of the second mobile carrier can surely be maintained. The second mobile carrier keeps operating without an interruption. The transport mechanism thus keeps operating without an interruption.

According to a third aspect of the present invention, there is provided a transport mechanism comprising: a rail; a mobile carrier supported on the rail for relative movement, said mobile carrier accessible to individual cells defined in a storage; and a support member supporting the rail for relative movement in the direction of movement of the mobile carrier.

The transport mechanism allows the support member to support the rail for relative movement in the direction of movement of the mobile carrier. If the rail moves relative to the support member, the mobile carrier can be moved relative to the support member. The mobile carrier can in this manner be brought to a position distanced from the storage, for example. Even when the mobile carrier suffers from a fault, the mobile carrier can be repaired or replaced in a facilitated manner. The transport mechanism may further comprise a support designed to support the support member for relative movement along a plane perpendicular to the rail.

According to a fourth aspect of the present invention, there is provided a transport mechanism comprising: an enclosure: a storage installed inside the enclosure; a support installed inside the enclosure; a rail supported on the support for relative movement; and a mobile carrier supported on the rail for relative movement within a predetermined movable range, said mobile carrier accessible to individual cells defined in the storage, wherein said movable range of the mobile carrier is displaced based on the movement of the rail between a first position inside the enclosure and a second position located at least partially outside the enclosure.

The transport mechanism allows the mobile carrier to move to the second position outside the enclosure based on the movement of the rail. Even when the mobile carrier suffers from a fault, the mobile carrier can be subjected to a repair or replacement operation at the second position. The repair or replacement of the mobile carrier can be effected in a facilitated manner even if a narrower space is defined in the enclosure.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
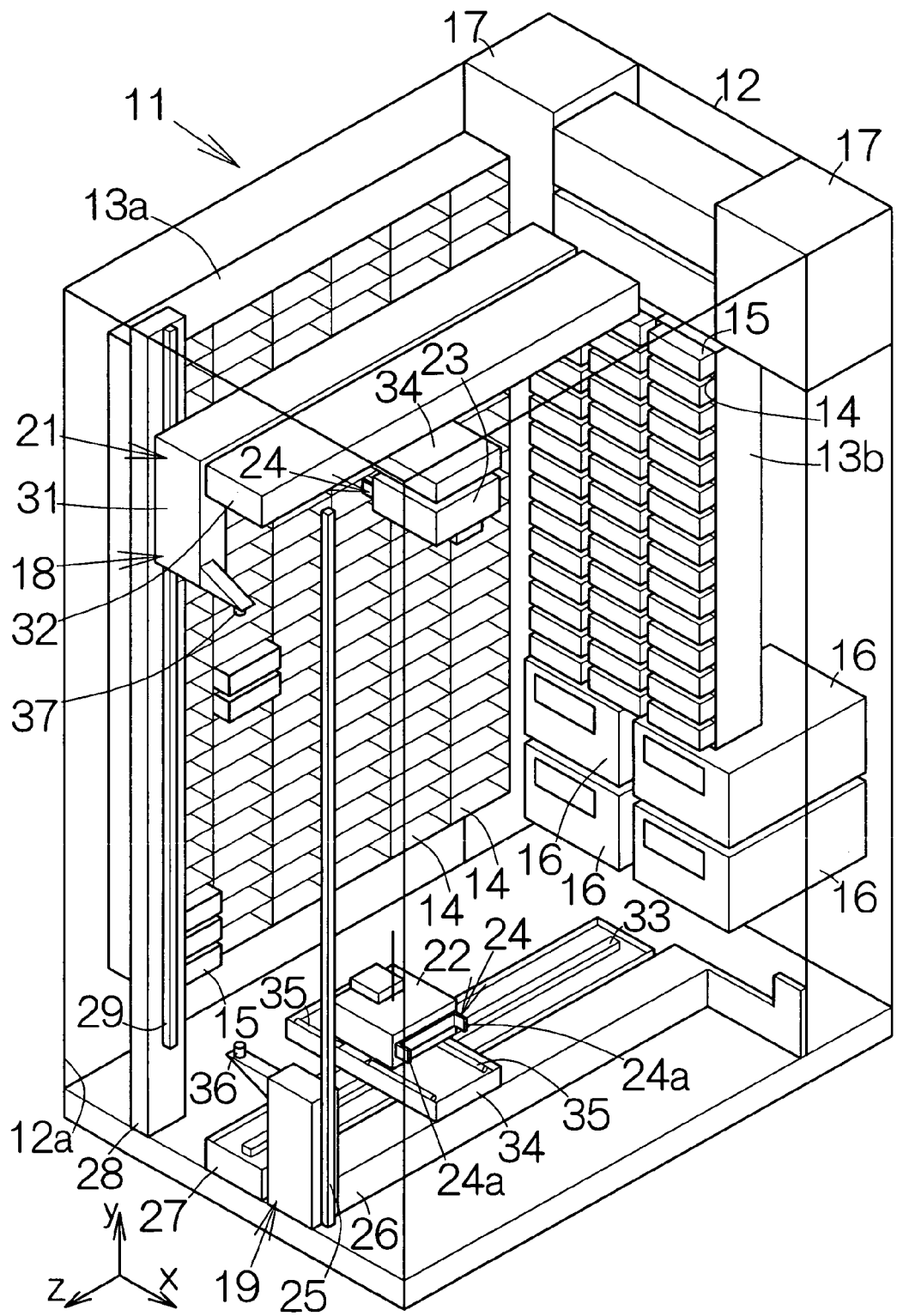
FIG. 1 is a perspective view schematically illustrating the overall structure of a magnetic tape library apparatus according to a first embodiment of the present invention.

FIG. 1 schematically illustrates a magnetic tape library apparatus as an example of a library apparatus according to a first embodiment of the present invention. The magnetic tape library apparatus 11 includes an box-shaped enclosure 12. The enclosure 12 defines an inner space of a parallelepiped standing upright from a floor, for example. Storage cabinets 13a, 13b are placed within the inner space of the enclosure 12. A pair of the storage cabinet 13a, 13a is opposed to each other interposing a predetermined central space of a parallelepiped. Another storage cabinet 13b is placed at a position adjacent the central space. The individual storage cabinet 13a, 13a, 13b includes cells 14, 14, . . . arranged along a plane upright to the floor, namely a side surface of the central space. Objects or recording media such as magnetic tape cartridges 15 are contained within the individual cells 14.

An opening 12a is defined in the enclosure 12. The opening 12a is opposed to the storage cabinet 13b across the central space. The opening 12a is designed to extend along a plane upright to the floor, for example. A door, not shown, is utilized to close the opening 12a, for example.

Here, an xyz-coordinate system is defined in the central space. The y-axis of the xyz-coordinate system is set perpendicular to the floor. The y-coordinate thus serves to identify the position of the cells 14 in the vertical direction. The z-axis of the xyz-coordinate system is set to extend in the horizontal direction in parallel with the storage cabinets 13a, 13a. The z-coordinate thus serves to identify the position of the cells 14 in the storage cabinets 13a, 13a in the horizontal direction. The x-axis of the xyz-coordinate system is set to extend in the horizontal direction in parallel with the storage cabinet 13b. The x-coordinate thus serves to identify the position of the cells 14 in the storage cabinet 13b in the horizontal direction.

For example, four magnetic recording medium drives or magnetic tape drives 16 are incorporated within the inner space of the enclosure 12. The magnetic tape drives 16 are designed to write magnetic information data into a magnetic recording tape inside the magnetic tap cartridge 15. The magnetic tape drives 16 are also designed to read magnetic information data out of the magnetic recording tape inside the magnetic tape cartridge 15. The magnetic tape cartridge 15 is inserted into and withdrawn from the magnetic tape drive 16 through a slot. The magnetic recording tape is unwound from a reel within the magnetic tape cartridge 15 in the magnetic tape drive 16. The unwound magnetic recording tape is then wound around a reel within the magnetic tape drive 16.

A pair of storage box 17 is incorporated within the inner space of the enclosure 12. A library controller board and a first controller board are contained within one of the storage boxes 17. A second controller board is contained within the other of the storage boxes 17. The library controller board and the first and second controller boards will be described later in detail. An outside host computer, not shown, is connected to the library controller board. Various processings are effected at the library controller board as well as the first and second controller boards based on data and/or instructions supplied from the host computer.

A transport mechanism 18 is incorporated within the central space in the enclosure 12. The transport mechanism 18 includes first and second mobile carriers 19, 21. The first and second mobile carriers 19, 21 are designed to carry the magnetic tape cartridge 15 between the individual cells 14, 14, . . . and the individual magnetic tape drives 16.

The first and second mobile carriers 19, 21 include a mobile unit 22, 23, respectively. A grasping mechanism 24 is incorporated in the mobile unit 22, 23. The grasping mechanism 24 is designed to hold the magnetic tape cartridge 15. The mobile unit 22, 23 is designed to oppose the grasping mechanism 24 to the opening of the individual cell 14 when the grasping mechanism 24 holds or releases the magnetic tape cartridge 15.

The grasping mechanism 24 includes a pair of claw 24a, 24a spaced from each other in the horizontal direction. The claws 24a, 24a are designed to move in the longitudinal direction along a guide rail, not shown, incorporated in the first and second mobile unit 22, 23. A drive mechanism is connected to the claws 24a so as to move the claws 24a. A so-called rack-and-pinion mechanism may be employed as the drive mechanism, for example. A power source such as an electric motor may be connected to the pinion of the rack-and-pinion mechanism. A stepping motor may be utilized as the electric motor, for example. The electric motor is referred to as "grasping electric motor" hereinafter.

The first mobile carrier 19 is coupled to a first support column, not shown, standing upright from the floor. A first rail 25 is fixed to the first support column. The first rail 25 extends in the vertical direction. A support or guide member 26 is coupled to the first rail 25. A first rail base 27 is coupled to the guide member 26. The first rail base 27 is designed to move relative to the guide member 26 in parallel with the z-axis, as described later. The guide member 26 and the first rail base 27 extend in the horizontal direction in parallel with the storage cabinets 13a, 13a. The first rail base 27 is positioned at an intermediate position equally spaced from the storage cabinets 13a, 13a.

The guide member 26 and the first rail base 27 are allowed to move upward and downward along the first rail 25 in parallel with the y-axis. A drive mechanism is connected to the guide member 26 for the upward and downward movement. The drive mechanism may include a belt coupled to the guide member 26 at the tip end, and a hoist designed to wind up the belt, for example. A power source such as an electric motor is incorporated in the hoist, for example. A stepping motor may be utilized as the electric motor, for example. The electric motor is referred to as "y-axis electric motor" hereinafter, for example.

Likewise, the second mobile carrier 21 is coupled to a second support column 28 standing upright from the floor. A first rail 29 is fixed to the second support column 28. The first rail 29 extends in the vertical direction. A support or guide member 31 is coupled to the first rail 29. A first rail base 32 is coupled to the guide member 31. The first rail base 32 is likewise designed to move relative to the guide member 31 in parallel with the z-axis. The guide member 31 and the first rail base 32 extend in the horizontal direction in parallel with the storage cabinets 13a, 13a. The first rail base 32 is positioned at an intermediate position equally spaced from the storage cabinets 13a, 13a.

The guide member 31 and the first rail base 32 are allowed to move upward and downward along the first rail 29 in parallel with the y-axis. A drive mechanism is connected to the guide member 31 for the upward and downward movement. The drive mechanism may include a belt coupled to the guide member 31 at the tip end, and a hoist designed to wind up the belt, for example. A power source such as an electric motor is incorporated in the hoist, for example. A stepping motor may be utilized as the electric motor, for example. The electric motor is referred to as "y-axis electric motor" hereinafter, for example. The guide members 26, 31 and the first rail bases 27, 32 are arranged in the vertical direction along the y-axis. The first rail base 32 of the second mobile carrier 21 moves above the first rail base 27 of the first mobile carrier 19.

A second rail 33 is incorporated within the first rail base 27, 32. A second rail base 34 is coupled to the individual second rail 33. The second rail base 34 extends in the horizontal direction in parallel with the storage cabinet 13b. Specifically, the second rail 33 intersects with the xy-plane including the first rail 25, 29. The aforementioned first support column and the second support column 28 support the support members 26, 31 for displacement in parallel with the y-axis along the xy-plane perpendicular to the second rail 33. The second rail 33 is supported on the support member 26 for relative movement in the direction of the movement of the first mobile unit 22.

The second rail base 34 is designed to move in the horizontal direction along the rail 33 in parallel with the z-axis. A drive mechanism is connected to the second rail base 34 for the horizontal movement. The drive mechanism may include an endless belt wound around a pair of pulleys on the first rail base 27, 32, and a power source establishing a driving force to drive one of the pulleys for rotation, for example. The endless belt may be coupled to the second rail base 34. An electric motor may be utilized as the power source. A stepping motor may be employed as the electric motor, for example. The electric motor is referred to as "z-axis electric motor" hereinafter.

A pair of third rail 35, 35 is incorporated in the second rail base 34, 34. The mobile unit 22, 23 is coupled to the third rails 35, 35. The third rails 35 are set perpendicular to the yz-plane including the second rail 33. The mobile unit 22, 23 is thus allowed to move in the horizontal direction along the third rails 35, 35 in parallel with the x-axis. A drive mechanism is connected to the mobile unit 22, 23 for the horizontal movement. The drive mechanism may include an endless belt wound around a pair of pulleys on the second rail base 34, and a power source establishing a driving force to drive one of the pulleys for rotation, for example. The endless belt may be coupled to the mobile unit 22, 23. An electric motor may be utilized as the power source. A stepping motor may be employed as the electric motor, for example. The electric motor is referred to as "x-axis electric motor" hereinafter.

Moreover, the mobile unit 22, 23 is coupled to the second rail base 34 for relative rotation around a rotation axis parallel to the vertical axis or y-axis. A drive mechanism is connected to the mobile unit 22, 23 for the relative rotation. The drive mechanism may include an endless belt wound around a rotation shaft on the mobile unit 22, 23 and a pulley on the second rail base 34, and a power source establishing a driving force to drive the pulley for rotation, for example. An electric motor may be utilized as the power source. A stepping motor may be employed as the electric motor, for example. The electric motor is referred to as "revolution electric motor" hereinafter.

The first and second mobile carriers 19, 21 are designed to have predetermined opposed surfaces spaced from each other in the vertical direction. A columnar elastic piece 36 is fixed to the opposed surface of the first mobile carrier 19. The elastic piece 36 stands upward from the opposed surface. Likewise, a columnar elastic piece 37 is fixed to the opposed surface of the second mobile carrier 21. The elastic piece 37 stands downward from the opposed surface. The elastic piece 36, 37 may be fixed to the support member 26, 29. The elastic pieces 36, 37 may be made of an elastic resin material such as rubber, for example.

The first and second mobile carriers 19, 21 get closest to each other at the elastic pieces 36, 37 in the direction of the y-axis. Accordingly, when the first and second mobile carriers 19, 21 approaches each other, the elastic pieces 36, 37 first contact with each other. The impact of the collision can thus be moderated. The first and second mobile carriers 19, 21 are thus protected from the impact of the collision. Moreover, the mobile units 22, 23 are prevented from contacting with each other. The mobile units 22, 23 can thus reliably be prevented from suffering from damages.

The magnetic tape library apparatus 11 utilizes the coordinates in the xyz-coordinate system and the angle around the rotation axis for the mobile unit 22, 23 so as to identify the position of the cell 14. The mobile units 22, 23 on the first and second mobile carrier 19, 21 are positioned based on the coordinates in the xyz-coordinate system. At the same time, the attitude or orientation of the mobile unit 22, 23 is determined based on the angle of rotation around the rotation axis. If the mobile unit 22, 23 is positioned in accordance with the coordinates set for the individual cell 14 and controlled for rotation in accordance with the angle of rotation, the mobile unit 22, 23 is allowed to direct the grasping mechanism 24 exactly to the opening of the corresponding cell 14.

Figure 2:
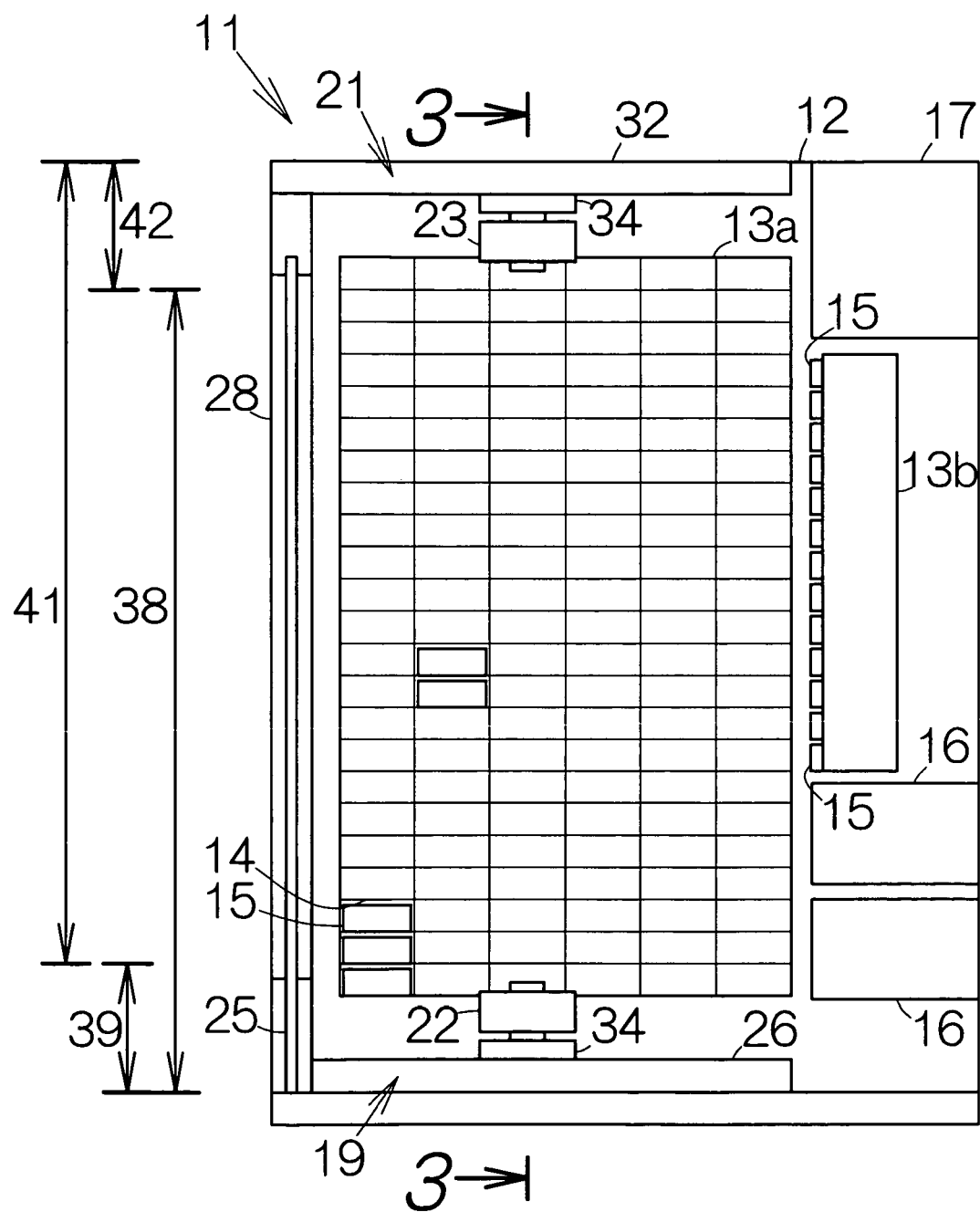
FIG. 2 is a side view of the magnetic tape library apparatus for schematically illustrating movable ranges of first and second mobile carriers.

Predetermined off positions are set for the first and second mobile carriers 19, 21, respectively, in the magnetic tape library apparatus 11. As shown in FIG. 2, the off position of the first mobile carrier 19 is located at the lowermost position 39 of a first movable range 38 of the first mobile carrier 19. In this case, the support member 26 and the first rail base 27 of the first mobile carrier 19 are positioned at the lower limit of the first rail 25. When the first mobile carrier 19 is positioned at the off position, the second mobile carrier 21 is allowed to access all the cells 14 except the cells 14 at the lowermost row.

On the other hand, the off position of the second mobile carrier 21 is located at the uppermost position 42 of a second movable range 41 of the second mobile carrier 21. In this case, the guide member 31 and the first rail base 32 of the second mobile carrier 21 are positioned at the upper limit of the first rail 29. When the second mobile carrier 21 is positioned at the off position, the first mobile carrier 19 is allowed to access all the cells 14 except the cells 14 at the uppermost row.

Here, the second movable range 41 of the second mobile carrier 21 in this manner wraps over the first movable range 38 of the first mobile carrier 19 except the uppermost position 42 of the second mobile carrier 21 and the lowermost position 39 of the first mobile carrier 19. Specifically, the off position of the first mobile carrier 19 is set outside the second movable range of the second mobile carrier 21. Likewise, the off position of the second mobile carrier 21 is set outside the first movable range 38 of the first mobile carrier 19. Since the storage cabinets 13a, 13b are located closer to each other in the magnetic tape library apparatus 11, the mobile unit 22, 23 contacts with the storage cabinets 13a, 13b at some locations determined by specific coordinates and specific angles of rotation. The locations of the type are excluded from the first and second movable ranges 38, 41 of the first and second mobile carriers 19, 21.

Figure 3:
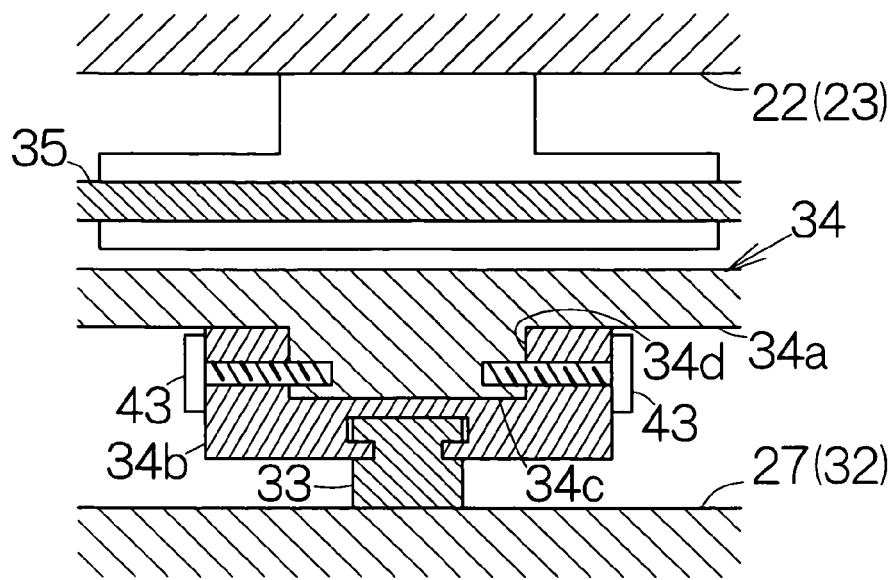
FIG. 3 is a sectional view taken along the line 3-3 in FIG. 2.

As shown in FIG. 3, the second rail base 34 includes a base body 34a and a rail block 34b fixed to the base body 34a. The rail block 34b is coupled to the second rail 33 for relative movement. A protrusion 34c is formed on the bottom surface of the base body 34a. The protrusion 34c protrudes toward the first rail base 27, 32. The protrusion 34c is received in a depression 34d defined in the rail block 34b.

The protrusion 34c has a cylindrical shape, while the depression 34d is designed to define a cylindrical space. The longitudinal axis of the protrusion 34c is set in parallel with the y-axis. The longitudinal axis of the cylindrical space inside the depression 34d is also set in parallel with the y-axis. When the protrusion 34c is received in the depression 34d, the longitudinal axis of the protrusion 34c is aligned with the longitudinal axis of the cylindrical space in the depression 34d. The combination of the protrusion 34c and the depression 34d allows the relative rotation between the base body 34a and the rail block 34b. Screws 43 are employed to secure the base body 34a on the rail block 34b, for example. The screws 43 may penetrate through the rail block 34b so as to reach the base body 34a. The screws 43 restrain the relative rotation of the base body 34a on the rail block 34b.

Figure 4:
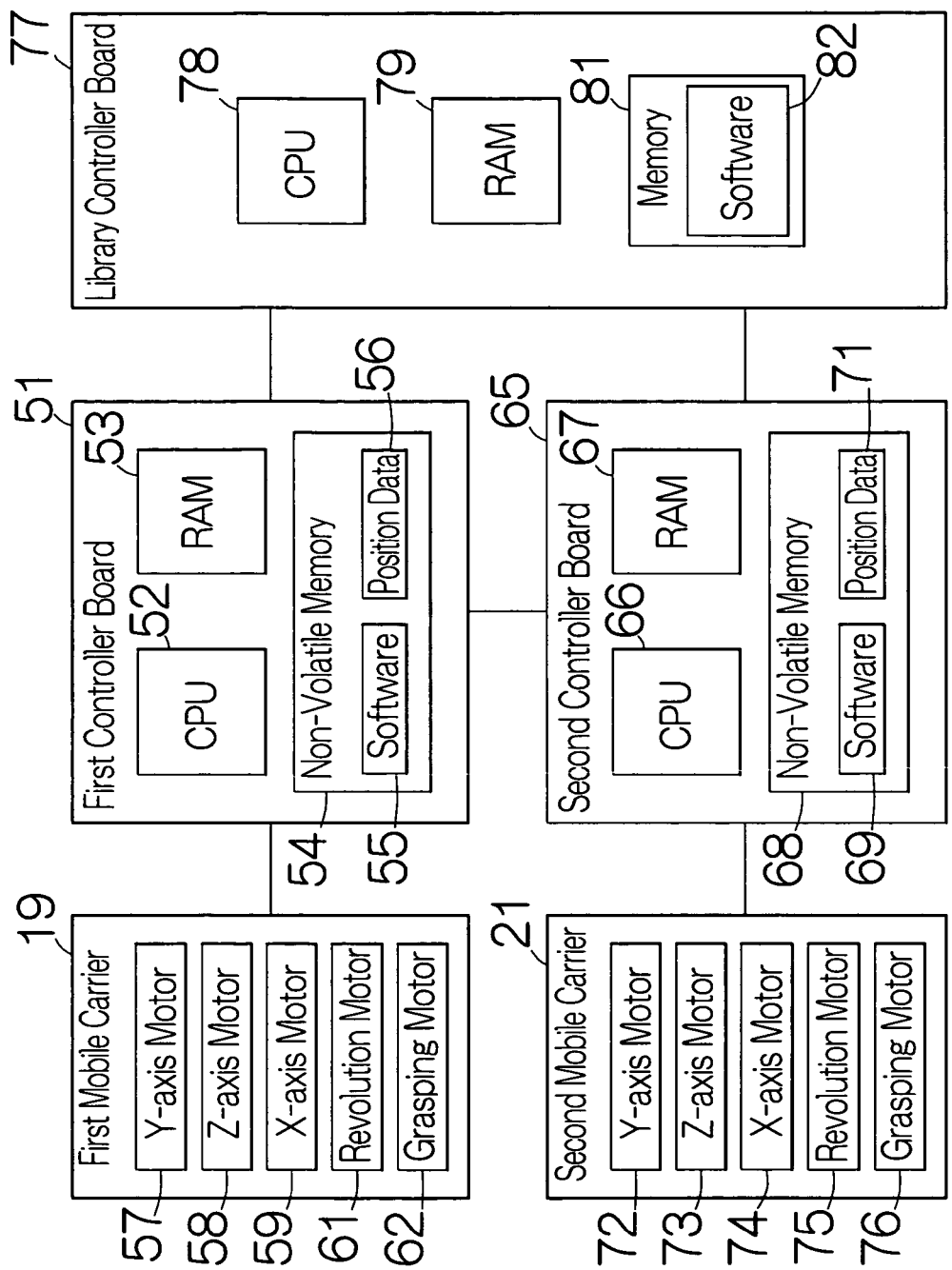
FIG. 4 is a block diagram schematically illustrating the structure of a library controller board as well as of first and second controller boards.

As shown in FIG. 4, a first controller board 51 is connected to the first mobile carrier 19. A first controller circuit or central processing unit (CPU) 52 is mounted on the first controller board 51. A random access memory (RAM) 53 and a non-volatile memory 54 are connected to the CPU 52. A flash memory may be utilized as the non-volatile memory 54, for example.

A software program 55 and a position data 56 are stored in the non-volatile memory 54. The position data specifies the position of the opening for the individual cells 14, 14, . . . in the aforementioned manner. The x-, y- and z-coordinates and the angle of rotation are designated in the position data as described above. The first and second movable ranges 38, 41 are determined for the first and second mobile carriers 19, 21 based on the position data 56. The CPU 52 implements various processings based on the software program 55 and the position data 56 temporarily stored in the RAM 53.

The y-axis electric motor 57, the z-axis electric motor 58, the x-axis electric motor 59, the revolution electric motor 61, and the grasping electric motor 62 in the first mobile carrier 19 are connected to the CPU 52. The CPU 52 is designed to supply the driving signals to the y-axis electric motor 57, the z-axis electric motor 58, the x-axis electric motor 59, the revolution electric motor 61, and the grasping electric motor 62, respectively. The electric motor 57-62 is controlled to rotate over an angle or amount at a revolution rate designated in the driving signal. The angle or amount of rotation set for the electric motors 57-62 serve to determine the amounts of movement in the y-, z- and x-axis and the amount of rotation around the rotation axis, of the mobile unit 22, as well as the amount of movement of the grasping mechanism 24 in the mobile unit 22.

A second controller board 65 is connected to the second mobile carrier 21. A second controller circuit or central processing unit (CPU) 66 is mounted on the second controller board 65. A random access memory (RAM) 67 and a non-volatile memory 68 are connected to the CPU 66. A flash memory may be utilized as the non-volatile memory 68, for example. A software program 69 and a position data 71 are stored in the non-volatile memory 68 in the same manner as described above. The CPU 66 implements various processings based on the software program 69 and the position data 71 temporarily stored in the RAM 67.

The y-axis electric motor 72, the z-axis electric motor 73, the x-axis electric motor 74, the revolution electric motor 75, and the grasping electric motor 76 in the second mobile carrier 21 are connected to the CPU 66. The CPU 66 is designed to supply the driving signals to the y-axis electric motor 72, the z-axis electric motor 73, the x-axis electric motor 74, the revolution electric motor 75, and the grasping electric motor 76, respectively. The electric motor 72-76 is controlled to rotate over an angle or amount at a revolution rate designated in the driving signal. The angle or amount of rotation set for the electric motors 72-76 serve to determine the amounts of movement in the y-, z- and x-axis and the amount of rotation around the rotation axis, of the mobile unit 23, as well as the amount of movement of the grasping mechanism 24 in the mobile unit 23.

The first and second controller boards 51, 65 are connected to the library controller board 77. The library controller board 77 includes a CPU 78, a RAM 79 and a non-volatile memory 81, for example. A software program 82 is stored in the non-volatile memory 81. The CPU 78 implements various processings based on the software program 82 temporarily stored in the RAM 79. The library controller board 77 is connected to the host computer.

Figure 5:
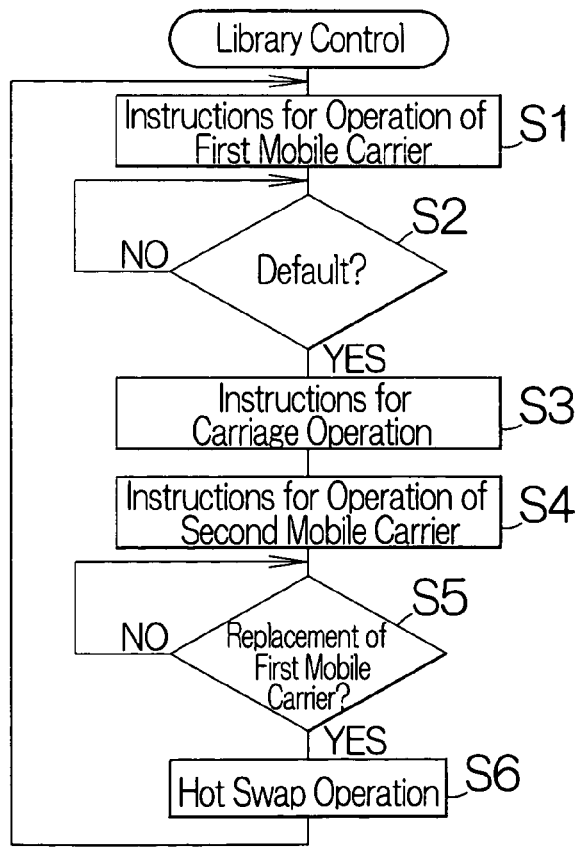
FIG. 5 is a flowchart schematically illustrating the process of a library control.

Next, description will be made on the operation of the magnetic tape library apparatus 11. The CPU 78 on the library controller board 77 executes the library control based on the software program 82 in the non-volatile memory 81. As shown in FIG. 5, the CPU 78 supplies at step S1 the first controller board 51 with instruction signals to operate the first mobile carrier 19. The instruction signals specify the y-, z- and x-coordinates, the amount or angle of rotation of the mobile unit 22 and the coordinate of movement of the claws 24a. The grasping mechanism 24 of the first mobile carrier 19 is allowed to face a target cell 14 or a target magnetic tape drive 16 based on the coordinates and angle of rotation.

When the grasping mechanism 24 is opposed to the cell 14, the magnetic tape cartridge 15 in the cell 14 can be taken into the mobile unit 22. The magnetic tape cartridge 15 in the mobile unit 22 can be returned to the cell 14. The magnetic tape cartridge 15 can in this manner be transported between the cells 14 and the magnetic tape drives 16. The magnetic tape drives 16 serve to read the information data recorded on the magnetic recording tape in the magnetic tape cartridge 15, or to write the information data into the magnetic recording tape in the magnetic tape cartridge 15. The second mobile carrier 21 stands on the off position during the operation of the first mobile carrier 19.

The CPU 78 keeps monitoring occurrence of a fault in the first mobile carrier 19 during the operation of the first mobile carrier 19 at step S2. If a fault happens in the first mobile carrier 19, for example, the processing of the CPU 78 advances to step S3. The CPU 78 supplies the second controller board 65 with instruction signals for the implementation of a carriage operation at step S3. Here, the fault of the first mobile carrier 19 may include a fault in the electric motors 57-62 as well as in the first controller board 51, for example.

When the CPU 66 on the second controller board 65 receives the instruction signals from the CPU 78, the CPU 66 operates to drive the second mobile carrier 21. A driving signal is supplied to the y-axis electric motor 72, for example.

The guide member 31 and the first rail base 32 of the second mobile carrier 21 thus move downward toward the off position of the first mobile carrier 19. The guide member 31 of the second mobile carrier 21 collides against the guide member 26 of the first mobile carrier 19 during the downward movement. The elastic pieces 36, 37 collide against each other. Here, no restraint is applied to the y-axis electric motor 57 in the first mobile carrier 19. When the second mobile carrier 21 keeps moving downward, the first mobile carrier 19 is conveyed to the off position.

The CPU 78 then supplies the second controller board 65 with instruction signals to operate the second mobile carrier 21 at step S4. The magnetic tape library apparatus 11 in this manner allows the second mobile carrier 21 to take over the transportation of the magnetic tape cartridge 15. The library board 77, the second controller board 66 and the second mobile carrier 21 keep operating even during the replacement of the first mobile carrier 19. The replacement of the first mobile carrier 19 will be described later in detail.

The CPU 78 thereafter operates to inform the operator of the fault of the first mobile carrier 19 at step S5. The CPU 78 simultaneously keeps monitoring the replacement of the first mobile carrier 19, for example. When the first mobile carrier 19 has been replaced with new one, the processing of the CPU 78 advances to step S6. The CPU 78 implements a hot swap operation at step S6. The hot swap operation allows establishment of connection between the first controller board 51 and the renewed first mobile carrier 19. When the hot swap operation of the first mobile carrier 19 has been completed, the processing of the CPU 78 returns to step S1. The first mobile carrier 19 returns to the transportation of the magnetic tape cartridge 15. The second mobile carrier 21 stands at the off position.

Even when the first mobile carrier 19 suffers from a fault, the magnetic tape library apparatus 11 allows the first mobile carrier 19 to reach the off position with the assistance of the second mobile carrier 21. The second mobile carrier 21 is subsequently utilized to realize the transportation of the magnetic tape cartridge 15. Interference can reliably be avoided between the first and second mobile carriers 19, 21. The first mobile carrier 19 can be replaced with new one without interruption in the operation of the library board 77 and the second controller board 65. The read/write operation can be kept without any interruption in the magnetic tape library apparatus 11. The magnetic tape library apparatus 11 keeps operating all the time. It should be noted that the second mobile carrier 21 may keep operating even after the replacement of the first mobile carrier 19 in the magnetic tape library apparatus 11.

Figure 6:
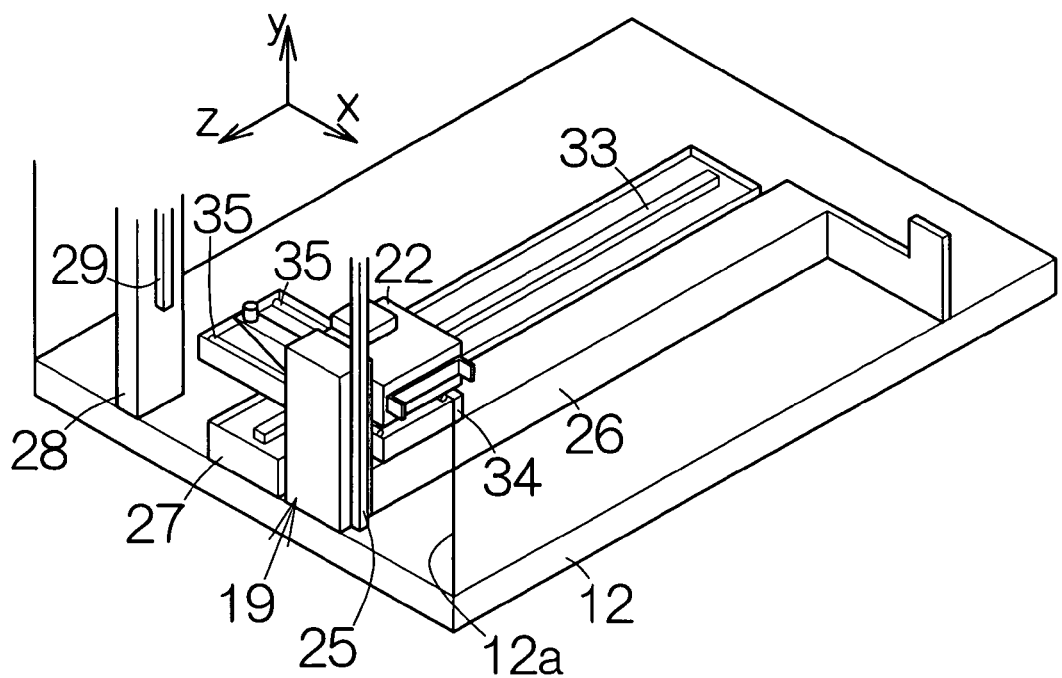
FIG. 6 is a perspective view schematically illustrating a first mobile unit on the first mobile carrier subjected to carriage to an off position.

Next, a detailed description will be made on the replacement of the first mobile carrier 19. Here, the first mobile unit 22 is to be replaced in particular. As described above, the first mobile carrier 19 is carried to the off position based on the operation of the second mobile carrier 21. In this case, the first rail base 27 is completely located within the enclosure 12, as shown in FIG. 6. The mobile unit 22 is then positioned at a first position within the enclosure 12. The door is opened at the opening 12a. The first mobile unit 22 is positioned on the first rail base 27 at the end closer to the opening 12a. No restriction is effected on the z-axis and x-axis electric motors 58, 59 in this case. The operator is allowed to move the first mobile unit 22 with his/her hand.

Figure 7:
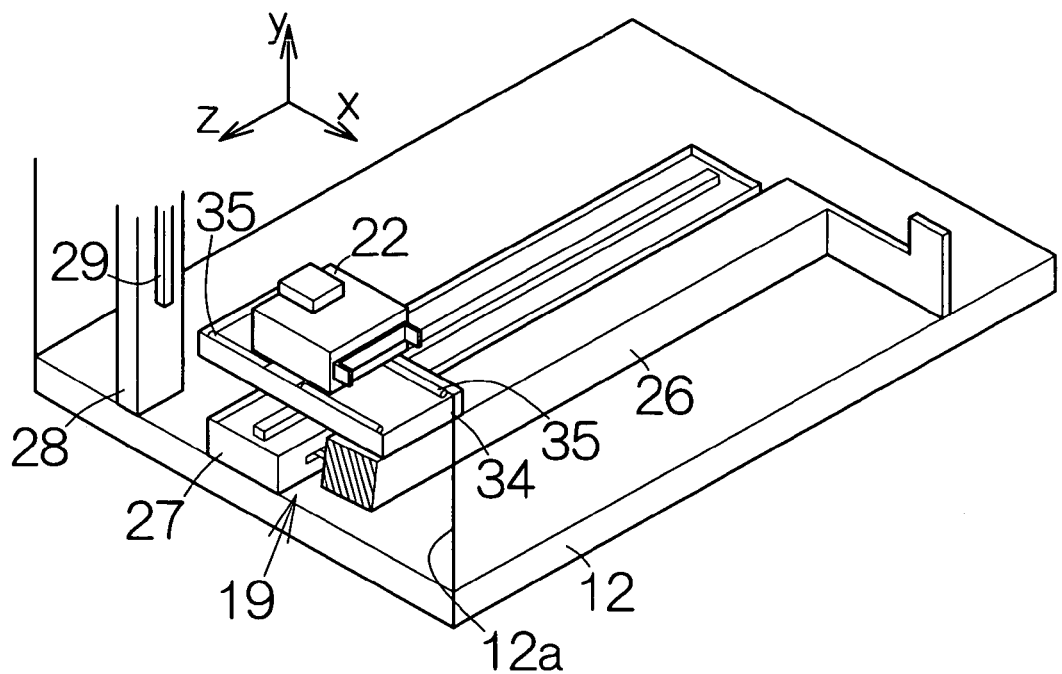
FIG. 7 is a perspective view schematically illustrating the first mobile unit positioned above a first rail base.
Figure 8:
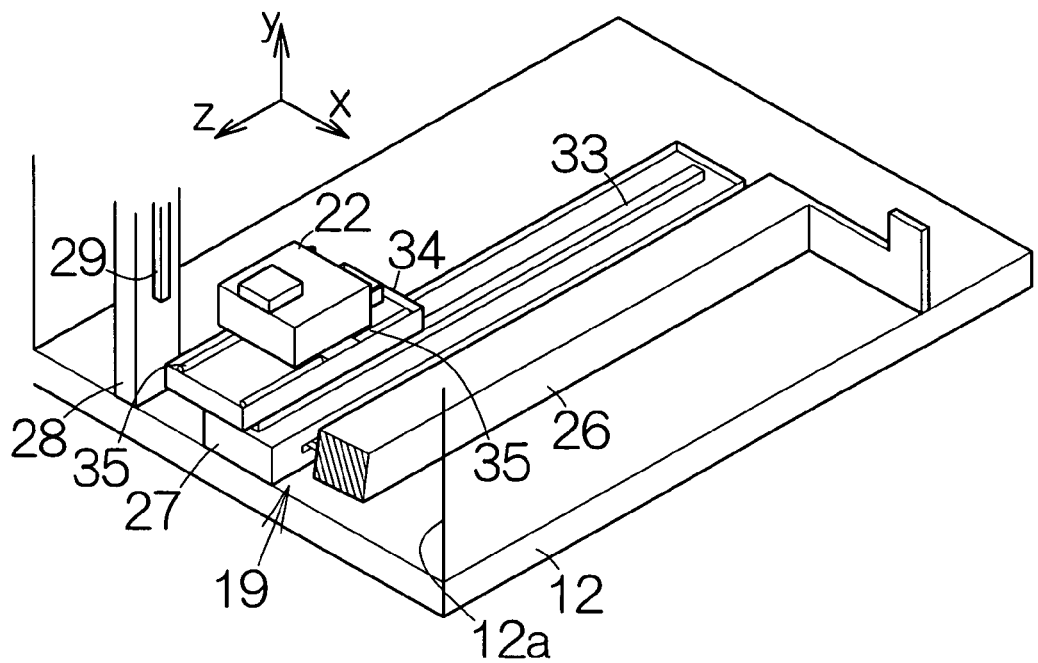
FIG. 8 is a perspective view schematically illustrating the first mobile unit on a second rail base rotating on the first rail base.

The operator is then invited to move the first mobile unit 22 in parallel with the x-axis. The first mobile unit 22 moves along the third rail 35. As shown in FIG. 7, the first mobile unit 22 is positioned just above the first rail base 27 at an intermediate position of the second rail base 34. The operator is subsequently allowed to remove the screws 43 from the rail block 34b. the operator is invited to rotate the base body 34a on the rail block 34b after the removal of the screws 43. As shown in FIG. 8, the base body 34a of the second rail base 34 is rotated relative to the first rail base 27 by 90 degrees approximately in the counterclockwise direction. The second rail base 34 is oriented in parallel with the first rail base 27.

Figure 9:
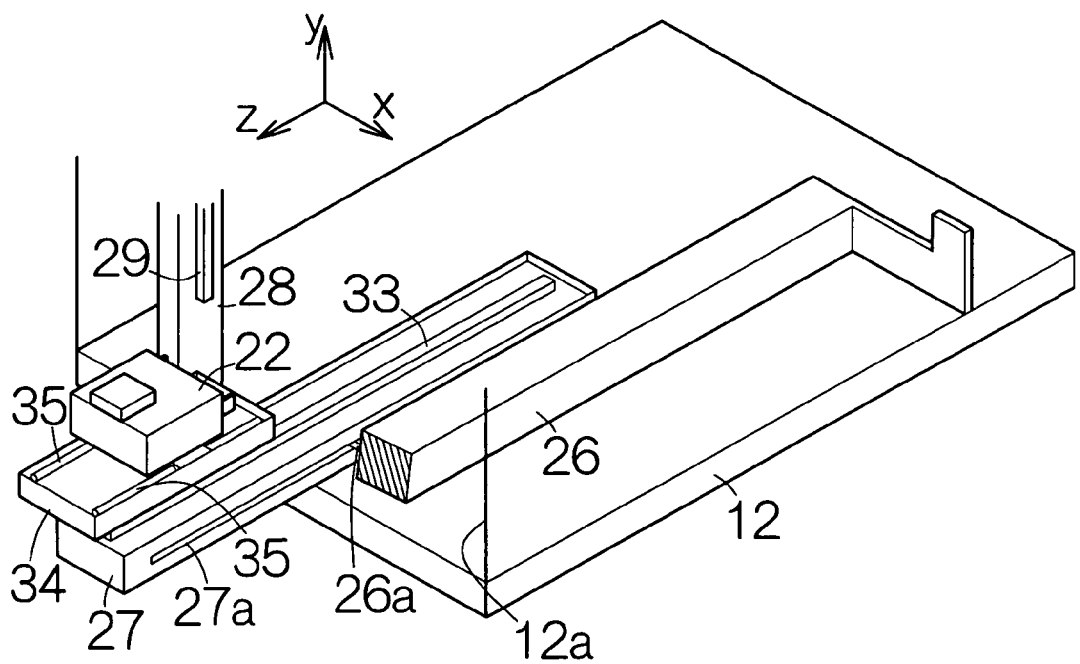
FIG. 9 is a perspective view schematically illustrating the first mobile unit located outside an enclosure.

The operator is then allowed to pull the first rail base 27 in parallel with the z-axis out of the enclosure 12 through the opening 12a. The first rail base 27 is moved relative to the guide member 26 in parallel with the z-axis. As shown in FIG. 9, a groove 27a is defined in the first rail base 27 to extend in parallel with the z-axis, for example. The groove 27a is designed to receive a protrusion 26a protruding from the guide member 26. The protrusion 26a may extend over the entire length of the guide member 26 in the z-axis. The movement of the first rail base 27 can in this manner be realized. The movement of the first rail base 27 enables disposition of the second rail base 34 and the first mobile unit 22 out of the enclosure 12. The first mobile unit 22 is thus located at a second position outside the first movable range 38 or the enclosure 12. The movable range of the first mobile unit 22 can in this manner be displaced. The first mobile unit 22 can be removed from the first rail base 27 along with the second rail base 34. The first mobile unit 22 can be replaced.

Even when the first mobile carrier 19 suffers from a fault, the magnetic tape library apparatus 11 allows removal of the first and second rail bases 27, 34 and the first mobile unit 22 out of the enclosure 12. In this case, the first mobile unit 22 is allowed to move in the horizontal direction without entering the second movable range 41. The first and second rail bases 27, 34 and the first mobile unit 22 can be replaced with new ones without any difficulty. In addition, the second mobile carrier 21 is allowed to keep operating within the second movable range 41. The second mobile carrier 21 serves to keep implementing the transportation of the magnetic tape cartridges 15. The magnetic tape library apparatus 11 keeps operating without any interruption.

Figure 10:
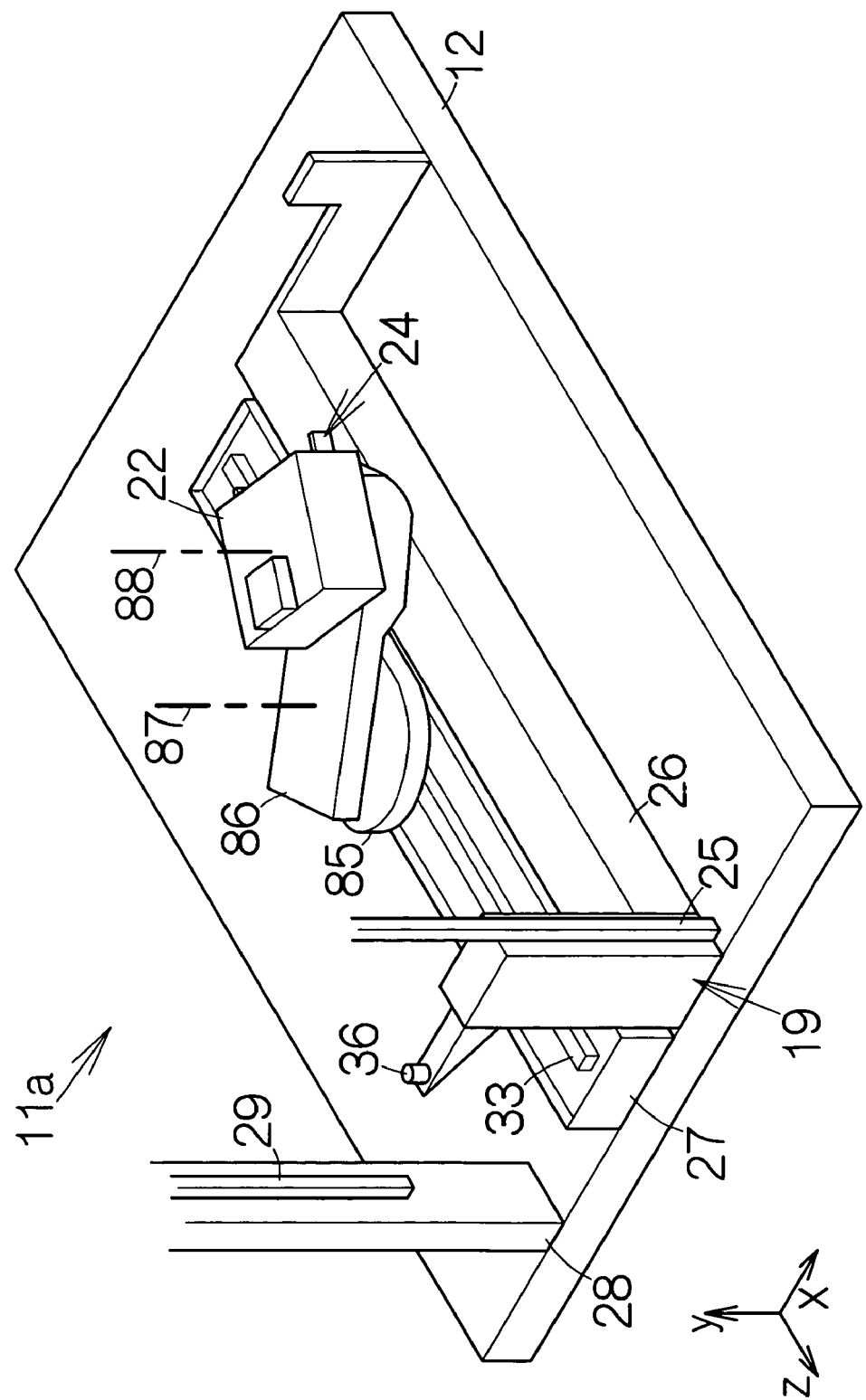
FIG. 10 is a perspective view schematically illustrating the structure of a magnetic tape library apparatus according to a second embodiment of the present invention.

FIG. 10 schematically illustrates the structure of a magnetic tape library apparatus 11a according to a second embodiment of the present invention. The magnetic tape library apparatus 11a includes, in place of the aforementioned second rail base 34, a base 85 and a rotative arm 86 coupled to the base 85. The rotative arm 86 is supported on the base 85 for relative rotation around a rotation axis 87 extending in parallel with the y-axis. The first mobile unit 22 is supported on the rotative arm 86 for relative rotation around a rotation axis 88 extending in parallel with the rotation axis 87.

The rotation axis 88 is distanced from the rotation axis 87 by a predetermined space. Here, the rotation axis 88 is located at a position off the rotation axis 87 toward the tip end of the rotative arm 86. When the rotative arm 86 rotates around the rotation axis 87, the rotation axis 88 moves around the rotation axis 87 along an arc. The rotation of the rotative arm 86 serves to realize the movement of the first mobile unit 22 in the direction of the x-axis.

A drive mechanism is coupled to the rotative arm 86 for the revolution of the rotative arm 86. The drive mechanism may include an endless belt wound around a rotation shaft on the rotative arm 86 and a pulley on the base 85, and a power source establishing a driving force to drive the pulley for rotation. An electric motor may be utilized as the power source. A stepping motor may be employed as the electric motor, for example. The electric motor is referred to as "arm electric motor" hereinafter. The arm electric motor is connected to the aforementioned CPU 52 on the first controller board 51. The angle or amount of rotation set for the electric motors 57-62, including the arm electric motor, serve to determine the amounts of movement in the y-, z- and x-axis and the amount of rotation around the rotation axis, of the mobile unit 22, as well as the amount of movement of the grasping mechanism 24 in the mobile unit 22.

The base 85 is allowed to move in the horizontal direction in parallel with the z-axis along the second rail 33 in the same manner as the aforementioned second rail base 34. A drive mechanism is coupled to the base 85 for the movement. The aforementioned drive mechanism of the second rail base 34 may be employed as the drive mechanism for the base 85. The second mobile carrier 21 may be structured in the same manner as the first mobile carrier 19. Like reference numerals are attached to structures or components equivalent to those of the aforementioned first embodiment.

The magnetic tape library apparatus 11a allows employment of the x-, y- and z-coordinates and the angle of rotation around the rotation axes 87, 88 to determine the position of the individual cells 14, 14, . . . . The x-, y- and z-coordinates and the angle of rotation around the rotation axis 87 are employed to position the mobile units 22, 23 of the first and second mobile carriers 19, 21. Additionally, the angles of rotation around the rotation axes 87, 88 are employed to set the direction of the first and second mobile unit 22, 23. When the movement and rotation of the mobile unit 22, 23 are controlled in accordance with the x-, y- and z-coordinates and the angle of rotation as described above, the first and second mobile unit 22, 23 is allowed to oppose the grasping mechanism 24 to the opening of the individual cell 14, 14, . . . .

Figure 11:
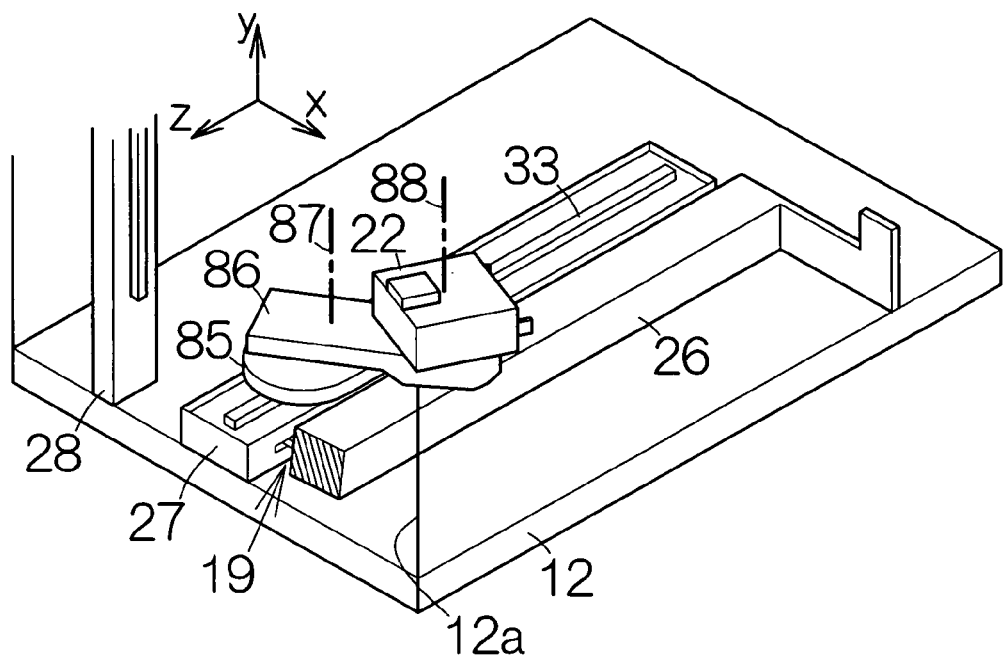
FIG. 11 is a perspective view schematically illustrating a first mobile unit on the first mobile carrier subjected to carriage to an off position.

Next, a detailed description will be made on the replacement of the first mobile carrier 19. Here, the first mobile unit 22 is to be replaced in particular. As described above, the first mobile carrier 19 is carried to the off position based on the operation of the second mobile carrier 21. In this case, the first rail base 27 is completely located within the enclosure 12, as shown in FIG. 11. The mobile unit 22 is then positioned at a first position within the enclosure 12. The door is opened at the opening 12a. The base 85 is positioned on the first rail base 27 at the end closer to the opening 12a. No restriction is effected on the z-axis and x-axis electric motors 58, 59 as well as on the arm and revolution electric motors in this case. The operator is allowed to move the base 85, the rotative arm 86 and the first mobile unit 22 with his/her hand.

Figure 12:
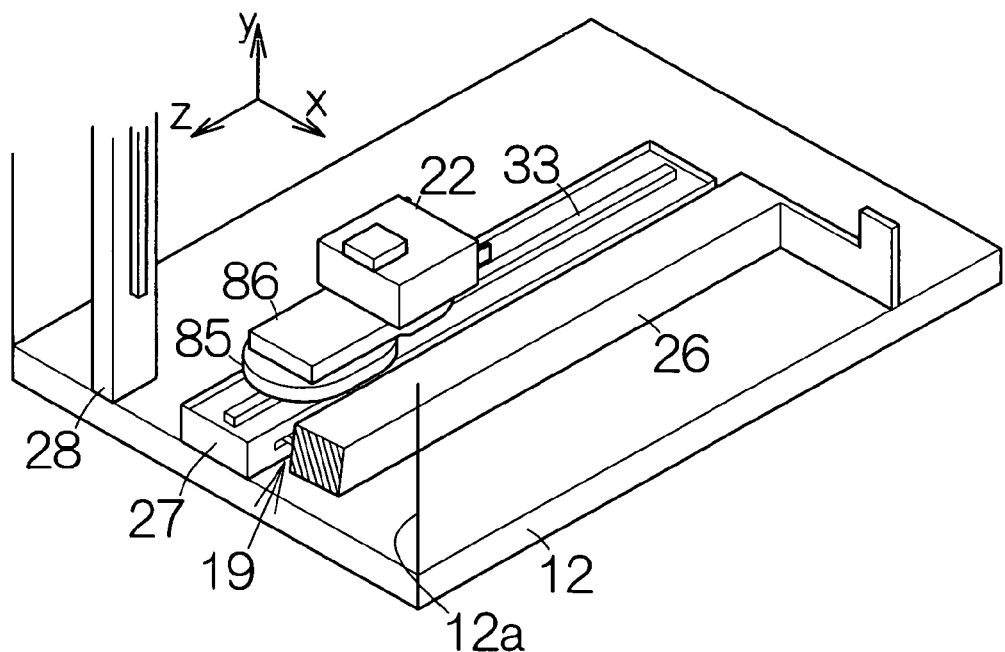
FIG. 12 is a perspective view schematically illustrating the first mobile unit set in an attitude parallel to the first rail base.

The operator is then invited to rotate the rotative arm 86 around the rotation axis 87. The rotative arm 86 is allowed to take an attitude parallel to the first rail base 27 through the rotation on the base 85 over a predetermined angle of rotation, as shown in FIG. 12. Additionally, the operator is invited to rotate the first mobile unit 22 relative to the rotative arm 86. The first mobile unit 22 is thus set in an attitude parallel to the first rail base 27 and the rotative arm 86 through the rotation on the rotative arm 86 over a predetermined angle of rotation.

Figure 13:
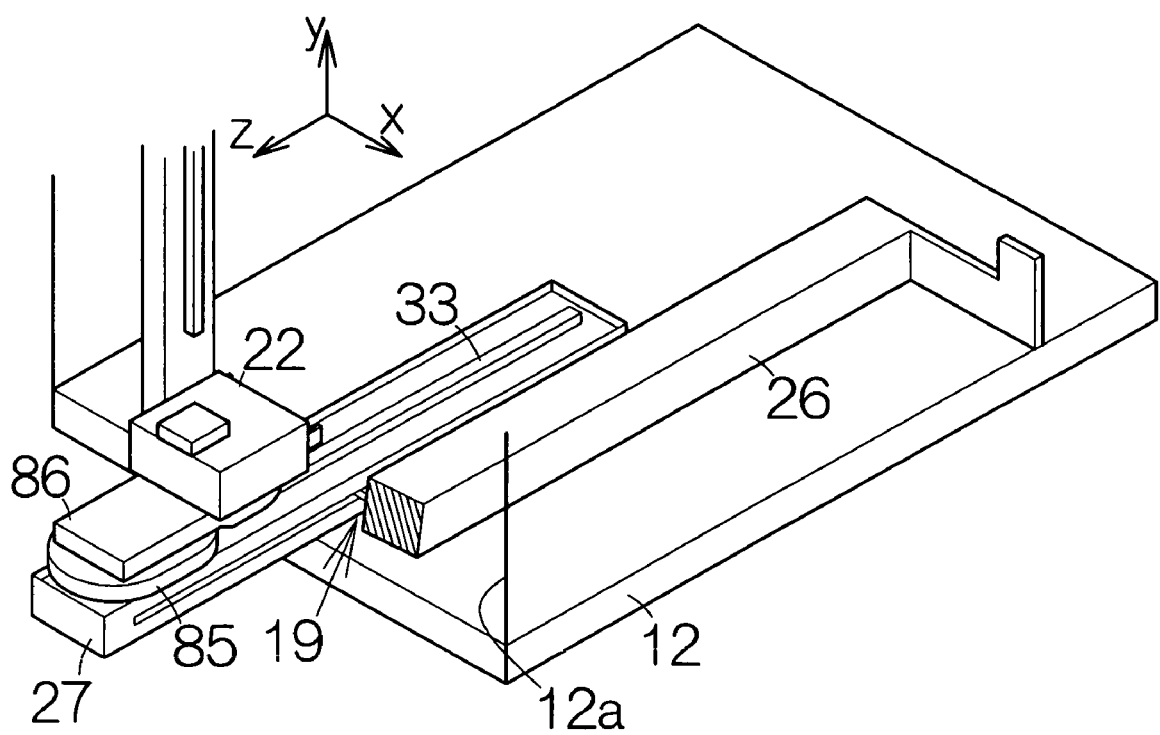
FIG. 13 a perspective view schematically illustrating the first mobile unit located outside an enclosure.

The operator is then allowed to pull the first rail base 27 in parallel with the z-axis out of the enclosure 12 through the opening 12a in the same manner as described above. The first rail base 27 is moved relative to the guide member 26 in parallel with the z-axis. As shown in FIG. 13, the movement of the first rail base 27 enables disposition of the base 85, the rotative arm 86 and the first mobile unit 22 out of the enclosure 12. The first mobile unit 22 is thus located at a second position outside the first movable range 38 or the enclosure 12. The operator is subsequently allowed to remove screws for fixing the base 85, for example. The first mobile unit 22 can be removed from the first rail base 27 along with the base 85 and the rotative arm 86. The first mobile unit 22 can be replaced.

Even when the first mobile carrier 19 suffers from a fault, the magnetic tape library apparatus 11a allows removal of the first rail base 27, the base 85, the rotative arm 86 and the first mobile unit 22 out of the enclosure 12. The base 85, the rotative arm 86 and the first mobile unit 22 can be replaced with new ones without any difficulty. In addition, the mobile carrier 21 serves to keep implementing the transportation of the magnetic tape cartridges 15. The magnetic tape library apparatus 11a keeps operating without any interruption. Moreover, the rotative arm 86 can be set in parallel with the first rail base 27 without removing screws. This enables a facilitated operations for removal of the base 85, the rotative arm 86 and the first mobile unit 22 even as compared with the aforementioned first embodiment.

It should be noted that optical disks may be employed as the recording medium in place of the aforementioned magnetic tape cartridges 15, for example.

What is claimed is:

1. A method of controlling a transport mechanism, comprising:
   causing a first guide member to move on a first rail, when receiving an instruction signal specifying an access to a cell defined in a storage, while keeping the first guide member distanced from a second rail extending in parallel with the first rail, the first guide member supporting a first mobile unit holding a first grasping mechanism; and
   causing a second guide member to move on the second rail so that the second guide member engages the first guide member and carries the first guide member along the first rail to an off position, when a fault is detected in an action of at least one of a motor and a controller board for driving the first guide member, while keeping the second guide member distanced from the first rail, the second guide member supporting a second mobile unit holding a second grasping mechanism.

2. The method according to claim 1, wherein the second guide member carries the first guide member to a position outside a movable range of the second guide member when the fault has been detected.

3. The method according to claim 1, further comprising:
   monitoring a renewal of the first mobile unit after the fault has been detected in the action of the at least one of the first mobile unit and the first grasping mechanism; and
   implementing a hot swap operation to drive the first guide member on the first rail.

4. The method according to claim 1, wherein the first guide member includes a first piece, and the second guide member includes a second piece engaged with the first piece when the second guide member engages the first guide member.

* * * * *

UNITED STATES PATENT AND TRADEMARK OFFICE
CERTIFICATE OF CORRECTION

PATENT NO. : 8,124,214 B2
APPLICATION NO. : 11/093042
DATED : February 28, 2012
INVENTOR(S) : Daisuke Hori et al.

Page 1 of 1

It is certified that error appears in the above-identified patent and that said Letters Patent is hereby corrected as shown below:

Title Page of the Issued Patent, Under (75) Inventors, delete second inventor "Koujiro Hashimoto, Kawasaki (JP)".

Signed and Sealed this
Eighth Day of May, 2012

David J. Kappos
*Director of the United States Patent and Trademark Office*